(12) United States Patent
Mikami

(10) Patent No.: US 9,777,691 B2
(45) Date of Patent: Oct. 3, 2017

(54) VEHICLE CONTROL APPARATUS

(71) Applicant: Toyota Jidosha Kabushiki Kaisha, Toyota-shi Aichi-ken (JP)

(72) Inventor: Yasuyuki Mikami, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 169 days.

(21) Appl. No.: 14/859,837

(22) Filed: Sep. 21, 2015

(65) Prior Publication Data

US 2016/0097364 A1   Apr. 7, 2016

(30) Foreign Application Priority Data

Oct. 7, 2014  (JP) .................................. 2014-206707

(51) Int. Cl.
*F02N 11/00* (2006.01)
*F02N 11/08* (2006.01)

(52) U.S. Cl.
CPC ........ *F02N 11/084* (2013.01); *F02N 11/0833* (2013.01); *F02N 11/0837* (2013.01); *F02N 11/0862* (2013.01); *F02N 11/00* (2013.01); *Y02T 10/48* (2013.01)

(58) Field of Classification Search
CPC ............... F02N 11/084; F02N 11/0833; F02N 11/0862; F02N 11/0837; F02N 11/00; Y02T 10/48
See application file for complete search history.

(56) References Cited

U.S. PATENT DOCUMENTS

| | | | | |
|---|---|---|---|---|
| 2007/0245996 A1* | 10/2007 | Sasaki | ....................... | F02N 3/04 123/179.2 |
| 2012/0001547 A1* | 1/2012 | Nishitani | ................. | B60Q 1/50 315/82 |
| 2012/0206109 A1 | 8/2012 | Fassnacht et al. | | |
| 2013/0245925 A1* | 9/2013 | Malone | ............... | F02N 11/0818 701/113 |
| 2016/0061172 A1* | 3/2016 | Sato | ....................... | B60W 30/16 701/112 |

FOREIGN PATENT DOCUMENTS

| | | |
|---|---|---|
| JP | 2002-227885 A | 8/2002 |
| JP | 2005-207396 A | 8/2005 |

(Continued)

*Primary Examiner* — Carlos A Rivera
*Assistant Examiner* — Sherman Manley
(74) *Attorney, Agent, or Firm* — Dinsmore & Shohl LLP

(57) ABSTRACT

A vehicle control apparatus includes an engine configured to drive a vehicle; a starter configured to start the engine; a headlamp configured to radiate light in front of the vehicle; a battery configured to supply driving electric power to the starter and the headlamp; a brightness detection unit configured to detect a physical quantity corresponding to brightness around the vehicle; and a control unit configured to have the engine stop automatically when a predetermined stopping condition is satisfied, and to have the engine start automatically when a predetermined starting condition is satisfied. The control unit inhibits the engine from stopping automatically when the headlamp is lighted, and the physical quantity detected by the brightness detection unit is less than or equal to a predetermined threshold.

7 Claims, 4 Drawing Sheets

(56) References Cited

FOREIGN PATENT DOCUMENTS

| | | |
|---|---|---|
| JP | 2006-188122 A | 7/2006 |
| JP | 2007-320487 A | 12/2007 |
| JP | 2008-223564 A | 9/2008 |
| JP | 2010-116877 A | 5/2010 |
| JP | 2011-202645 A | 10/2011 |
| JP | 2011-214361 A | 10/2011 |
| JP | 2013-502536 A | 1/2013 |
| JP | 2013-072413 A | 4/2013 |
| JP | 2013072413 A * | 4/2013 |

* cited by examiner

FIG.4

| SOC[%] | 100~90 | 90~80 | 80~70 | 70~60 | 60~ |
|---|---|---|---|---|---|
| Eth[lx] | A11 | A12 | A13 | A14 | A15 |

FIG.5

| SOH[%] | 100~90 | 90~85 | 85~80 | 80~75 | 75~ |
|---|---|---|---|---|---|
| Eth[lx] | A21 | A22 | A23 | A24 | A25 |

FIG.6

| SOF[%] | 100~90 | 90~85 | 85~80 | 80~75 | 75~ |
|---|---|---|---|---|---|
| Eth[lx] | A31 | A32 | A33 | A34 | A35 |

FIG.7

| Vmin[V] | ~10 | 10~9 | 9~8 | 8~7 | 7~ |
|---|---|---|---|---|---|
| Eth[lx] | A41 | A42 | A43 | A44 | A45 |

VEHICLE CONTROL APPARATUS

FIELD

The disclosures herein generally relate to a vehicle control apparatus that has a function to have the engine stop automatically.

BACKGROUND

Conventionally, a technology has been proposed to improve the fuel efficiency of a vehicle by having the engine stop automatically while the vehicle is stopping or traveling (see, for example, Patent Documents 1-2).

Patent Document 1 discloses a start-stop control apparatus that has the engine stop automatically when the vehicle decelerates or stops (when the speed is reduced to a predetermined permission speed or lower).

Patent Document 2 discloses a vehicle control apparatus that has the engine stop automatically so that the vehicle travels by coasting (traveling by inertia) when a predetermined vehicle condition is satisfied while the vehicle is traveling (for example, the accelerator pedal is released while traveling at a predetermined speed or greater).

On the other hand, if the engine stops automatically as in Patent Documents 1-2, the headlight lighting in the night may go out or flicker due to a voltage drop of the battery when restarting the engine after it has stopped automatically. If the headlight lighting in the night goes out or flickers in this way, there may be unfavorable influences on the driver or other vehicles.

Thereupon, Patent Document 3 discloses an automatic stopping and starting apparatus that does not have the engine stop automatically while the headlight is on, to prevent the engine from stopping automatically in the night or in dark surroundings, and to prevent the headlight from going out.

RELATED-ART DOCUMENTS

Patent Documents

[Patent Document 1] Japanese Laid-open Patent Publication No. 2011-202645
[Patent Document 2] Japanese Laid-open Patent Publication No. 2002-227885
[Patent Document 3] Japanese Laid-open Patent Publication No. 2011-214361

However, if the engine is always inhibited from stopping automatically while the headlight is on as in Patent Document 3, it is not possible for a vehicle having the headlight on to improve the fuel efficiency by automatic stopping of the engine. Especially, there are vehicles in these days that have the headlights always turned on to make the vehicles more conspicuous in the daytime; it is not possible at all for such a vehicle to improve the fuel efficiency by automatic stopping of the engine.

Thereupon, in view of the above, it is an object of at least one embodiment of the present invention to provide a vehicle control apparatus that can have the engine stop automatically, depending on circumstances even if the headlight is on, while avoiding unfavorable influences of a gone-out or flickering headlight, which could happen when restarting the engine 10 after having the engine 10 stop automatically.

SUMMARY

According to an embodiment of the present invention, a vehicle control apparatus includes an engine configured to drive a vehicle; a starter configured to start the engine; a headlamp configured to radiate light in front of the vehicle; a battery configured to supply driving electric power to the starter and the headlamp; a brightness detection unit configured to detect a physical quantity corresponding to brightness around the vehicle; and a control unit configured to have the engine stop automatically when a predetermined stopping condition is satisfied, and to have the engine start automatically when a predetermined starting condition is satisfied. The control unit inhibits the engine from stopping automatically when the headlamp is lighted, and the physical quantity detected by the brightness detection unit is less than or equal to a predetermined threshold.

Also, according to another embodiment of the present invention, a vehicle control apparatus includes an engine configured to drive a vehicle; a starter configured to start the engine; a headlamp configured to radiate light in front of the vehicle; a battery configured to supply driving electric power to the starter and the headlamp; and a control unit configured to have the engine stop automatically when a predetermined stopping condition is satisfied, and to have the engine start automatically when a predetermined starting condition is satisfied. The vehicle includes an automatic lighting function to have the headlamp light automatically when brightness around the vehicle is reduced to a predetermined value or lower. The control unit inhibits the engine from stopping automatically if the headlamp is lighted in a circumstance where the automatic lighting function has the headlamp light automatically, or permits the engine to stop automatically if the headlamp is lighted in a circumstance where the automatic lighting function does not have the headlamp light automatically.

According to at least one embodiment of the present invention, it is possible to provide a vehicle control apparatus that can have the engine stop automatically, depending on circumstances even if the headlight is on, while avoiding unfavorable influences of a gone-out or flickering headlight, which could happen when restarting the engine 10 after having the engine 10 stop automatically.

BRIEF DESCRIPTION OF DRAWINGS

FIG. 4 is a diagram illustrating an example of a method of changing a threshold in the flowchart of FIG. 3;

FIG. 5 is a diagram illustrating another example of a method of changing the threshold in the flowchart of FIG. 3;

FIG. 6 is a diagram illustrating yet another example of a method of changing the threshold in the flowchart of FIG. 3; and FIG. 7 is a diagram illustrating yet another example of a method of changing the threshold in the flowchart of FIG. 3.

DESCRIPTION OF EMBODIMENTS

In the following, embodiments of the present invention will be described with reference to the drawings.

First Embodiment

Figure 1:
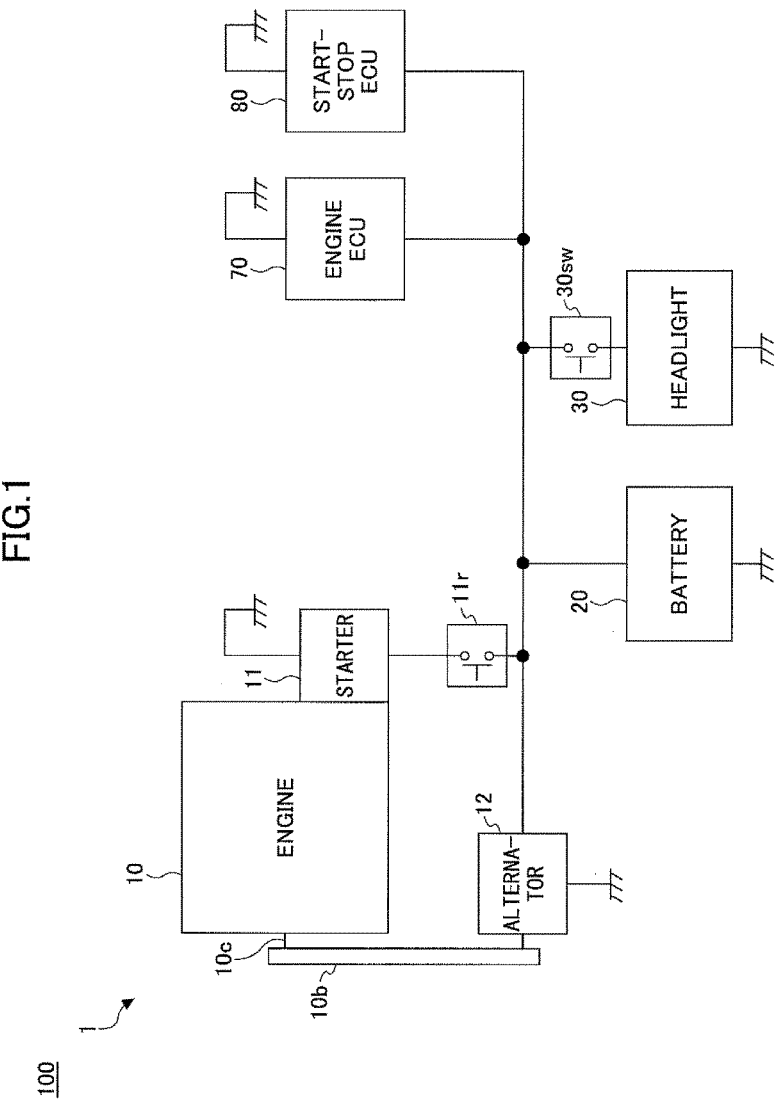
FIG. 1 is a block diagram illustrating an example of a configuration of a power supply system in a vehicle control apparatus.
Figure 2:
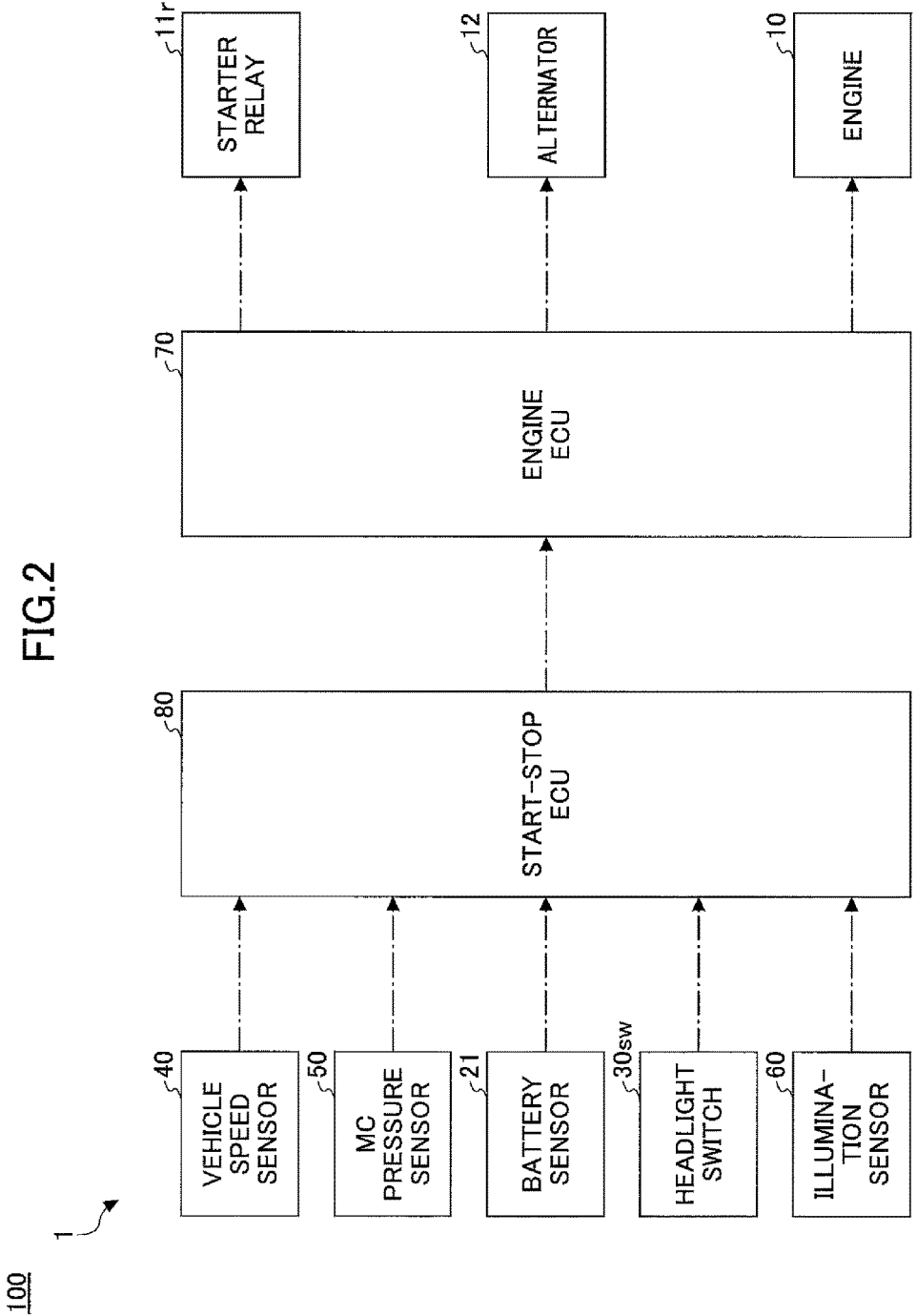
FIG. 2 is a block diagram illustrating an example of a configuration of a control system in a vehicle control apparatus.

FIGS. 1-2 are diagrams illustrating an example of a configuration of a vehicle control apparatus 1 installed in a vehicle 100. FIG. 1 is a block diagram illustrating an example of a configuration of a power supply system in the vehicle control apparatus 1; and FIG. 2 is a block diagram illustrating an example of a configuration of a control system in the vehicle control apparatus 1.

The vehicle control apparatus 1 includes an engine 10, a starter 11, a starter relay 11r, an alternator 12, a battery 20, a headlight 30, a headlight switch 30sw, an engine ECU (Electronic Control Unit) 70, and a start-stop ECU 80. The vehicle control apparatus 1 also includes a battery sensor 21, a vehicle speed sensor 40, an MC pressure sensor 50, and an illumination sensor 60.

The engine 10 is a source of the driving force of the vehicle 100. The engine 10 is started by the starter 11 that is driven by electric power supplied from the battery 20. Note that "started" is used in two contexts: the engine 10 is "started" by a usual operation of the ignition switch; and the engine 10 is "started" after having been stopped by start-stop control, which will be described later.

The starter 11 is a known starting unit to have the engine 10 start, and is driven by electric power supplied from the battery 20.

The starter relay 11r is disposed on a power supply path from the battery 20 to the starter 11. The starter relay 11r is controlled by the engine ECU 70, which will be described later, to switch between a connection state (ON) and a cut-off state (OFF). For example, when starting the engine 10, in response to a command from the engine ECU 70, the starter relay 11r is switched to a connection state to supply the driving power to the starter 11.

The alternator 12 is a direct-current (DC) generator driven by the driving force of the engine 10, and is configured with an alternating-current (AC) generator and a rectifier to convert three-phase AC power generated by the AC generator into DC power. The alternator 12 can generate power by the driving force of the engine 10 transferred from a crankshaft 10c via a belt 10b. The alternator 12 also includes a regulator that controls a power generation control current (a field current flowing in a rotor coil of the alternator 12), with which a power generation voltage of the alternator 12 can be controlled. Also, by having the power generation voltage controlled, the alternator 12 is capable of adjusting a power generation quantity. The power generated by the alternator 12 is used for charging the battery 20, and supplied as the driving power to electrical components of the vehicle 100 including the headlight 30, and various ECUs of the vehicle 100 including the engine ECU 70 and the start-stop ECU 80.

The battery 20 is connected in parallel with the starter 11, the headlight 30, the engine ECU 70, the start-stop ECU 80, and the like, and is an electrical energy storage device that can supply the electric power to these. For example, a lead battery, a nickel hydrogen battery, or a lithium ion battery may be used; the rated voltage (voltage between both terminals) is about 12 V. The battery 20 is connected with the alternator 12, and can be charged by electric power generated by the alternator 12.

The battery sensor 21 is a known state detection unit to detect states of the battery 20 including a state of charge (SOC), a state of health (SOH), and a state of function (SOF). The battery sensor 21 is connected with, for example, the negative-polarity terminal of the battery 20, and may include a voltage detection unit, a current detection unit, and a temperature detection unit that detect the voltage, the current, and the temperature of the battery 20, respectively; and a calculation unit to calculate the SOC, SOH and SOF of the battery 20, based on the detected voltage, current, and temperature, respectively. The battery sensor 21 is connected with the start-stop ECU 80 via an in-vehicle LAN or the like to communicate with each other, and information about the detected voltage, current, and temperature of the battery 20 and information about the states of the battery 20 including the detected (calculated) SOC, SOH, and SOF are transmitted to the start-stop ECU 80.

Note that, instead of the battery sensor 21, a voltage sensor, a current sensor, and a temperature sensor may be provided to detect the voltage, current, and temperature of the battery 20. In this case, these sensors output signals corresponding to the detected voltage, current, and temperature to the start-stop ECU 80, respectively. The start-stop ECU 80 calculates the SOC, SOH, and SOF of the battery 20 by a known method, based on the received signals corresponding to the voltage, current, and temperature. Also, a battery state monitor having the same function as the battery sensor 21 may be built in the battery 20.

The headlight 30 is an illumination unit to radiate light in front of the vehicle 100 that is disposed at a front part of the vehicle 100 (for example, at the right side part and the left side part of the front part of the vehicle 100). The headlight 30 is driven by electric power supplied from at least one of the battery 20 and the alternator 12, and comes on when the headlight switch 30sw is turned on by a predetermined operation by the driver of the vehicle 100, or goes out when the headlight switch 30sw is turned off.

The headlight switch 30sw is disposed on an electric power supply path from the battery 20 and the alternator 12 to the headlight 30. The driver of the vehicle 100 can turn on or off the headlight switch 30sw, namely, can light or turn out the headlight 30, by predetermined operations on a predetermined operational unit disposed in the compartment of the vehicle 100. The headlight switch 30sw is connected with the start-stop ECU 80 via an in-vehicle LAN or the like to communicate with each other, and a signal (ON signal or OFF signal) representing an on or off state of the headlight switch 30sw is transmitted to the start-stop ECU 80.

Note that the headlight switch 30sw may be configured to switch from off to on when it gets dark around the vehicle 100 (for example, illuminance detected by the illumination sensor 60 is less than or equal to a predetermined value), based on a control command from a body ECU (not shown). Namely, the headlight 30 may be configured to be capable of lighting automatically when it gets dark around the vehicle 100 (the illuminance is reduced to the predetermined value or lower).

The vehicle speed sensor 40 is a known vehicle speed detection unit that detects vehicle speed of the vehicle 100. The vehicle speed sensor 40 is connected with the start-stop ECU 80 via an in-vehicle LAN or the like to communicate with each other, and a signal (vehicle speed signal) corresponding to the detected vehicle speed is transmitted to the start-stop ECU 80.

The MC pressure sensor 50 is a known MC pressure detection unit that detects pressure in the master cylinder (MC pressure) of the vehicle 100. The MC pressure sensor 50 is connected with the start-stop ECU 80 via an in-vehicle LAN or the like to communicate with each other, and a signal (MC pressure signal) corresponding to the detected MC pressure is transmitted to the start-stop ECU 80.

The illumination sensor 60 is a known illuminance detection unit that detects illuminance, as a physical quantity corresponding to brightness around the vehicle 100, at a predetermined part on the outside or in the compartment of the vehicle 100. The illumination sensor 60 is disposed at, for example, an upper position of the instrument panel of the vehicle 100 (a position that is sufficiently illuminated by light from the outside of the compartment of the vehicle 100). The illumination sensor 60 is connected with the start-stop ECU 80 via an in-vehicle LAN or the like to communicate with each other, and a signal (illuminance signal) corresponding to the detected illuminance is transmitted to the start-stop ECU 80.

Note that although omitted in FIG. 1 for the sake of simplicity, the battery sensor 21, the vehicle speed sensor 40, the MC pressure sensor 50, and the illumination sensor 60 are driven by electric power supplied from the battery 20 (or an electric power source generated based on it).

The engine ECU 70 is an electronic control unit to control the engine 10, and operates on electric power supplied from at least one of the alternator 12 and the battery 20. The engine ECU 70 may be configured with, for example, a microcomputer to execute various control processes, which will be described later, by running various programs stored in a ROM on a CPU.

For example, the engine ECU 70 controls a fuel injector (fuel injection timing and fuel injection amount), an ignition plug (ignition timing), an intake/exhaust valve (open/close timing), and the like of the engine 10, based on accelerator opening, vehicle speed, crank angle, cam angle, rotational speed of the engine, and the like.

Also, the engine ECU 70 controls power generation of the alternator 12 via a regulator in the alternator 12. Specifically, the engine ECU 70 gives a command of a power generation voltage to the alternator 12. Depending on the commanded power generation voltage, the regulator in the alternator 12 adjusts a field current to have the power generation voltage of the alternator 12 controlled. For example, the engine ECU 70 controls the power generation voltage of the alternator 12 depending on the SOC of the battery 20 detected by the battery sensor 21. Namely, the engine ECU 70 raises the power generation voltage of the alternator 12 to charge the battery 20 if the SOC of the battery 20 is less than or equal to a predetermined value. Also, the engine ECU 70 lowers the power generation voltage of the alternator 12 to stop charging the battery 20 if the SOC of the battery 20 is greater than or equal to a predetermined value.

Also, the engine ECU 70 controls the starter relay 11r, which is disposed on an electric power supply path from the battery 20 to the starter 11, to drive the starter 11, and to have the engine 10 start. For example, if the driver turns on the ignition switch (IG switch), the on signal is input into the engine ECU 70, and then, the engine ECU 70 turns on the starter relay 11r to have the engine 10 start.

Also, the engine ECU 70 receives a request for stopping the engine 10, which is output from the start-stop ECU 80 as will be described later, and in response to the request for stopping the engine 10, cuts off fuel supply at a predetermined timing to have the engine 10 stop automatically (automatic stopping). Also, the engine ECU 70 receives a request for starting the engine 10, which is output from the start-stop ECU 80, and in response to the request for starting the engine 10, controls the starter relay 11r to drive the starter 11, and to have the engine 10 start automatically (automatic starting). In this way, the engine ECU 70 directly controls stopping and starting the engine in the start-stop function.

Note that the engine ECU 70 is connected with the engine 10 (and various sensors and actuators in it), the start-stop ECU 80, and other various sensor by an in-vehicle LAN or a direct line to communicate with each other.

The start-stop ECU 80 is an electronic control unit to execute start-stop control of the vehicle 100, and operates on electric power supplied from at least one of the alternator 12 and the battery 20. The start-stop ECU 80 may be configured with, for example, a microcomputer to execute various control processes, which will be described later, by running various programs stored in a ROM, on a CPU. Specifically, the start-stop ECU 80 determines whether a predetermined engine stopping condition is satisfied, and if the engine stopping condition is satisfied, outputs a request for stopping the engine 10 to the engine ECU 70. For example, while the vehicle 100 is traveling, for every predetermined interval, the start-stop ECU 80 determines whether predetermined engine stopping conditions are satisfied, which include that the MC pressure is greater than or equal to predetermined pedaling pressure (strength of a pedaling operation on the brake is greater than or equal to a predetermined value); that the speed of the vehicle 100 is reduced to predetermined permission speed or lower; and the like. In this way, if the vehicle 100 decelerates (the MC pressure is greater than or equal to the predetermined pedaling pressure), and the speed of the vehicle 100 is reduced to the predetermined permission speed or lower, the start-stop ECU 80 can have the engine 10 stop via the engine ECU 70, before the vehicle 100 stops. This improves the fuel efficiency.

Also, the start-stop ECU 80 determines whether a predetermined engine starting condition is satisfied, and if the engine starting condition is satisfied, outputs a request for starting the engine 10 to the engine ECU 70. For example, while the engine 10 is stopped by the start-stop control, for every predetermined interval, the start-stop ECU 80 determines whether predetermined engine starting conditions are satisfied, which include that the MC pressure is less than or equal to predetermined releasing pressure (a brake pedaling operation has been released), and the like.

Note that, in addition to the conditions on the vehicle speed and the MC pressure described above, the engine stopping conditions and engine starting conditions may include other conditions, for example, rotational speed of the engine 10, cooling water temperature, states of the battery 20 (current, voltage, temperature, SOC, SOH, SOF, and the like), negative pressure of a brake booster (not shown), a door courtesy switch (not shown), and the like. For example, the engine stopping conditions may include a condition that the SOC of the battery 20 detected (calculated) by the battery sensor 21 is greater than or equal to a predetermined value. Also, the engine starting conditions may include a condition that the negative pressure of the brake booster is reduced to a predetermined value or lower.

Also, based on a state of the headlight 30 (the lighting state or the off state), the start-stop ECU 80 executes a process to determine whether to permit the vehicle 100 to stop idling (automatic stopping of the engine 10 by the start-stop control described above). Although the process will be described later in detail, if the engine stopping conditions are satisfied as described above, and the start-stop ECU 80 permits the vehicle 100 to stop idling, the start-stop ECU 80 outputs a request for stopping the engine 10 to the engine ECU 70 as described above. On the other hand, even if the engine stopping conditions are satisfied as described above, but the start-stop ECU 80 does not permit (inhibits) the vehicle 100 to stop idling, the start-stop ECU 80 does not output a request for stopping the engine 10 to the engine ECU 70, and the vehicle 100 does not stop idling.

Note that the start-stop ECU 80 is connected with the battery sensor 21, the vehicle speed sensor 40, the MC pressure sensor 50, the illumination sensor 60, and the engine ECU 70, by an in-vehicle LAN or a direct line to communicate with each other.

Also, the functions of the engine ECU 70 and the start-stop ECU 80 may be arbitrarily implemented by hardware, software, or firmware, or a combination of these. Also, a part of or all of the functions of the engine ECU 70 and the start-stop ECU 80 may be implemented by other ECUs. Also, the engine ECU 70 and the start-stop ECU 80 may implement a part of or all of functions of the other ECUs. For example, a part of or all of the functions of the start-stop ECU 80 may be implemented by the engine ECU 70.

Next, a characteristic process executed by the vehicle control apparatus 1 (the start-stop ECU 80) according to the present embodiment, namely, a process that determines whether to permit the vehicle 100 to stop idling, will be described.

Figure 3:
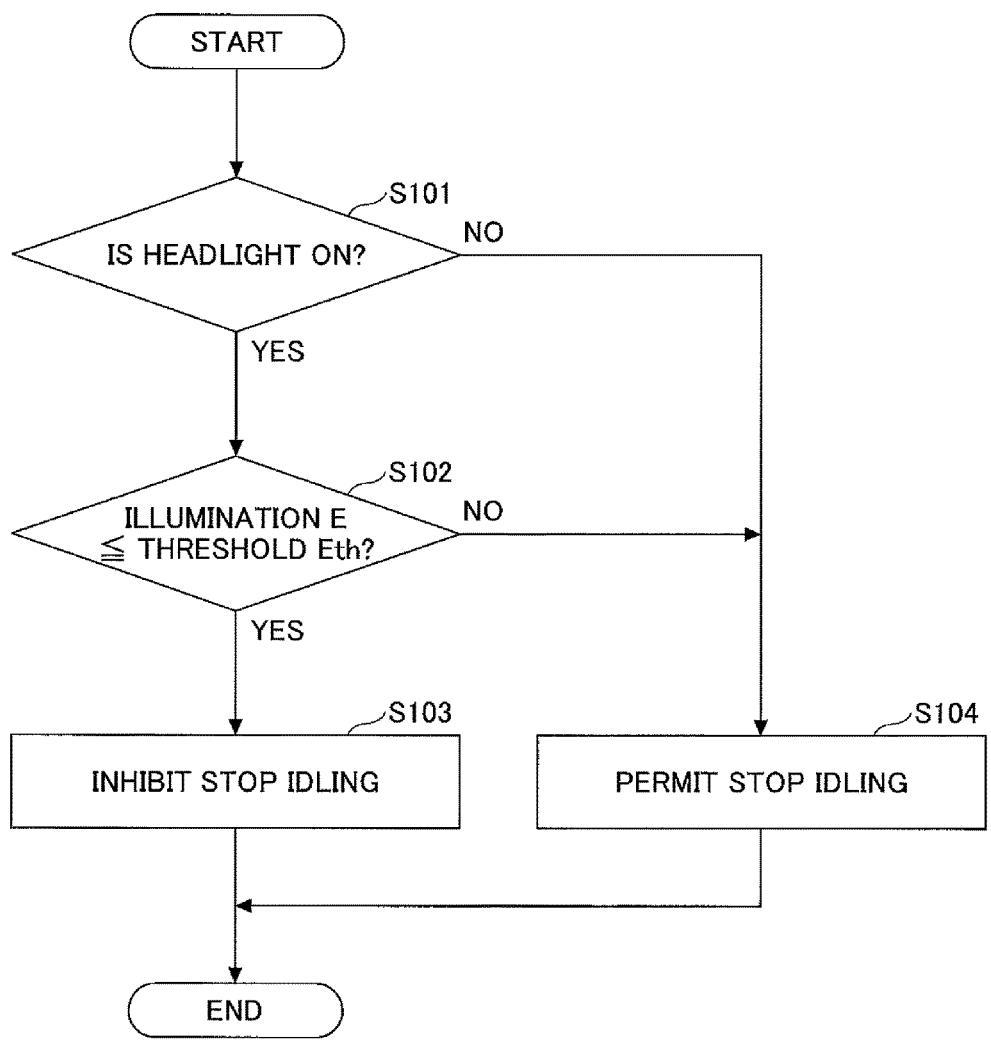
FIG. 3 is a flowchart illustrating an example of a control process executed by a vehicle control apparatus (start-stop ECU)

FIG. 3 is a flowchart illustrating an example of a control process (process that determines whether to permit the vehicle 100 to stop idling) executed by the vehicle control apparatus 1 (start-stop ECU 80) according to the present embodiment.

Note that after the ignition switch of the vehicle 100 has been turned on (IG-ON), the flowchart may be executed every time the engine stopping conditions are satisfied as described above. Also, the flowchart may be executed every predetermined interval after an IG-ON of the vehicle 100.

Referring to FIG. 3, at Step S101, the start-stop ECU 80 determines whether the headlight 30 is on, namely, the headlight switch 30sw is in an on state. If the headlight 30 is on, namely, the headlight switch 30sw is in an on state, the process goes forward to Step S102; or if the headlight 30 is off, namely, the headlight switch 30sw is in an off state, the process goes forward to Step S104.

At Step S102, the start-stop ECU 80 determines whether illuminance E, which is detected by the illumination sensor 60 (calculated based on an illuminance signal received by the illumination sensor 60), is less than or equal to a predetermined threshold Eth. If the illuminance E detected by the illumination sensor 60 is less than or equal to the predetermined threshold Eth, the process goes forward to Step S103; or if not less than or equal to the predetermined threshold Eth, namely, greater than the threshold Eth, the process goes forward to Step S104.

At Step S103, the start-stop ECU 80 inhibits the vehicle 100 from stopping idling, and the current process ends.

On the other hand, at Step S104 the start-stop ECU 80 permits the vehicle 100 to stop idling, and the current process ends.

In this way, the vehicle control apparatus 1 according to the present embodiment inhibits the vehicle 100 from stopping idling if the headlight 30 is on, and the illuminance E is less than or equal to the threshold Eth, which is a physical quantity corresponding to brightness around the vehicle 100. On the other hand, the vehicle control apparatus 1 according to the present embodiment permits the vehicle 100 to stop idling if the headlight 30 is on, and the illuminance E is not less than or equal to the threshold Eth (greater than the threshold Eth), which is the physical quantity corresponding to the brightness around the vehicle 100. This makes it possible for the vehicle control apparatus 1 to have the engine 10 stop automatically depending on circumstances even if the headlight is on, while avoiding unfavorable influences of a gone-out or flickering headlight, which could happen when restarting the engine 10 after having the engine 10 stop automatically.

Describing specifically, when restarting the engine 10 after having the engine 10 stopped by the start-stop control in a state where the headlight 30 is on, the voltage of the battery 20 is reduced greatly by supplying a high current to the starter 11. Therefore, depending on a lowest voltage at this moment (cranking voltage), the headlight 30 may flicker or go out. Especially, there are cases where the vehicle control apparatus 1 according to the present embodiment has the engine 10 stop automatically while the vehicle 100 is traveling (decelerating). Therefore, if the engine 10 restarts before the vehicle 100 stops, and the headlight 30 flickers or goes out at this moment, it may have great influence on the driver of the vehicle 100 and other vehicles around the vehicle 100. On the other hand, in a circumstance where it is comparatively bright around the vehicle 100 (the illuminance E is greater than the threshold Eth), even if the headlight 30 flickers or goes out, it has less influence on the driver of the vehicle 100 and other vehicles around the vehicle 100. Therefore, by inhibiting the vehicle 100 from stopping idling only when the headlight 30 is on and it is comparatively dark around the vehicle 100 (the illuminance E is less than or equal to the threshold Eth), the start-stop control can have the engine 10 stop automatically in a circumstance where it is comparatively bright around the vehicle 100, and influence of the flickering or gone-out headlight 30 can be avoided. Consequently, for example, even if the vehicle 100 turns on the headlight 30 to be more conspicuous even in clear daytime, the start-stop control has the engine 10 stop automatically, and the fuel efficiency of the vehicle 100 can be improved.

Note that assuming a case where the headlight 30 goes out or visibly flickers, the threshold Eth may be set as a limit value with which the driver of the vehicle 100 and other vehicles around the vehicle 100 are not influenced, by an experiment or computer simulation.

Also, if the vehicle 100 has a function to have the headlight 30 light automatically (automatic lighting function) when the brightness around the vehicle 100 is reduced to a predetermined value or less, the threshold Eth may be set to a value that corresponds to a condition of the brightness around the vehicle 100 for the automatic lighting function of the headlight 30. In other words, the start-stop ECU 80 may inhibit the vehicle 100 from stopping idling if the headlight 30 is on in a circumstance where the automatic lighting function is supposed to have the headlight 30 light automatically (the brightness of surroundings is reduced to the predetermined value or less). On the other hand, the start-stop ECU 80 may permit the vehicle 100 to stop idling if the headlight 30 is on in a circumstance where the automatic lighting function is not supposed to have the headlight 30 light automatically (the brightness of surroundings is not reduced to the predetermined value or less). In this case, substantially the same operations and effects can be obtained as in the embodiment described above.

Second Embodiment

Next, a second embodiment will be described.

A vehicle control apparatus 1 according to the present embodiment changes the threshold Eth in the flowchart of FIG. 3 described above, depending on a state relating to discharging performance of the battery 20. In this regard, it is different from the first embodiment. In the following, the same elements as in the first embodiment are assigned the same numerical codes, and different parts will be mainly described.

Note that a configuration of the vehicle control apparatus 1 according to the present embodiment can be represented by FIGS. 1-2 as in the first embodiment, and their description is omitted.

FIG. 4 is a diagram illustrating an example of a method of changing the threshold Eth in the flowchart of FIG. 3. Specifically, it is a diagram illustrating a relationship between the SOC of the battery 20 and the threshold Eth.

Note that, in the present embodiment, the SOC (state of charge) of the battery 20 is represented by a ratio (percentage) of a remaining capacity to the fully charged capacity of the battery 20. Namely, in the following description, "the SOC of the battery 20 is good" or "the SOC of the battery 20 is high" means that the remaining capacity of the battery 20 is in a comparatively high state, "the SOC of the battery 20 is bad" or "the SOC of the battery 20 is low" means that the remaining capacity of the battery 20 is in a comparatively low state. Also, a relationship among A11, A12, A13, A14, and A15, which represent specific numerical values in the figure, is A11<A12<A13<A14<A15.

Referring to FIG. 4, the start-stop ECU 80 sets the threshold Eth to A11 if the SOC of the battery 20 detected (calculated) by the battery sensor 21 is greater than or equal to 90% and less than or equal to 100%. Also, the start-stop ECU 80 sets the threshold Eth to A12 if the SOC of the battery 20 detected (calculated) by the battery sensor 21 is greater than or equal to 80% and less than 90%. Also, the start-stop ECU 80 sets the threshold Eth to A13 if the SOC of the battery 20 detected (calculated) by the battery sensor 21 is greater than or equal to 70% and less than 80%. Also, the start-stop ECU 80 sets the threshold Eth to A14 if the SOC of the battery 20 detected (calculated) by the battery sensor 21 is greater than or equal to 60% and less than or equal to 70%. Also, the start-stop ECU 80 sets the threshold Eth to A15 if the SOC of the battery 20 detected (calculated) by the battery sensor 21 is less than 60%.

In this way, the vehicle control apparatus 1 according to the present embodiment changes the threshold Eth which is used for determining whether to permit or inhibit the stop idling of the vehicle 100 depending on the SOC as a state relating to the discharging performance of the battery 20. Specifically, the threshold Eth is set to a smaller value for a better (higher) SOC of the battery 20, or a greater value for a worse (lower) SOC of the battery 20. This makes it possible to further increase opportunities of automatic stopping of the engine 10 by the start-stop control when the headlight 30 is on, and the fuel efficiency of the vehicle 100 can be further improved.

Describing specifically, the discharging performance of the battery 20 changes from time to time. Therefore, if not taking this change of the discharging performance of the battery 20 into consideration (this is the case of the first embodiment), the threshold Eth needs to be set to a fairly great value, assuming that the discharging performance of the battery 20 may be in a comparatively low state (a state in which the headlight 30 goes out, or visibly flickers in a comparatively bright circumstance, when starting the engine 10). On the other hand, in a state where the discharging performance of the battery 20 is high, the cranking voltage of the battery 20 is maintained comparatively high. Therefore, when starting the engine 10, the headlight 30 flickers to a lesser extent, which may be hardly discernible even when it is comparatively dark around the vehicle 100. Therefore, when the discharging performance of the battery 20 is higher, the threshold Eth may be set less. Thus, the threshold Eth is set with respect to a physical quantity (the illuminance E) corresponding to the brightness around the vehicle 100, and in accordance with the discharging performance of the battery 20 that changes from time to time. Therefore, for example, when the discharging performance of the battery 20 is comparatively high, it is possible to have the engine 10 stop automatically in a state where it is comparatively dark around the vehicle 100. Namely, it is possible to further increase opportunities of automatic stopping of the engine 10 by the start-stop control, and the fuel efficiency of the vehicle 100 can be further improved.

In the present embodiment, the SOC of the battery 20 is used as a state relating to the discharging performance of the battery 20. The discharging performance of the battery 20 and the SOC has a correlation where the higher the SOC of the battery 20 is, the higher the discharging performance of the battery 20 is, and the higher the cranking voltage of the battery 20 is when starting the engine 10. Therefore, the threshold Eth is set smaller when the SOC of the battery 20 is higher.

Next, FIG. 5 is a diagram illustrating another example of a method of changing the threshold in the flowchart of FIG. 3. Specifically, it is a diagram illustrating a relationship between the SOH of the battery 20 and the threshold Eth.

Note that, in the present embodiment, the SOH (state of health) of the battery 20 is represented by a ratio (percentage) of a current fully-charged capacity to the initial fully-charged capacity of the battery 20. Namely, in the following description, "the SOH of the battery 20 is good" or "the SOH of the battery 20 is high" means that the health of the battery 20 has not been degraded relatively, "the SOH of the battery 20 is bad" or "the SOH of the battery 20 is low" means that the remaining capacity of the battery 20 has been degraded relatively. Also, a relationship among A21, A22, A23, A24, and A25, which represent specific numerical values in the figure, is A21<A22<A23<A24<A25.

Referring to FIG. 5, the start-stop ECU 80 sets the threshold Eth to A21 if the SOH of the battery 20 detected (calculated) by the battery sensor 21 is greater than or equal to 90% and less than or equal to 100%. Also, the start-stop ECU 80 sets the threshold Eth to A22 if the SOH of the battery 20 detected (calculated) by the battery sensor 21 is greater than or equal to 85% and less than 90%. Also, the start-stop ECU 80 sets the threshold Eth to A23 if the SOH of the battery 20 detected (calculated) by the battery sensor 21 is greater than or equal to 80% and less than 85%. Also, the start-stop ECU 80 sets the threshold Eth to A24 if the SOH of the battery 20 detected (calculated) by the battery sensor 21 is greater than or equal to 75% and less than 80%. Also, the start-stop ECU 80 sets the threshold Eth to A25 if the SOH of the battery 20 detected (calculated) by the battery sensor 21 is less than 75%.

In this way, the vehicle control apparatus 1 according to the present embodiment changes the threshold Eth which is used for determining whether to permit or inhibit the stop idling of the vehicle 100 depending on the SOH as a state relating to discharging performance of the battery 20. Specifically, the threshold Eth is set to a smaller value for a better (higher) SOH of the battery 20, or a greater value for a worse (lower) SOH of the battery 20.

The discharging performance of the battery 20 and the SOH has a correlation where the higher the SOH of the battery 20 is, the higher the discharging performance of the battery 20 is, and the higher the cranking voltage of the battery 20 is when starting the engine 10. Therefore, by setting the threshold Eth smaller when the SOH of the battery 20 is higher, it is possible to further increase opportunities of automatic stopping of the engine 10 by the start-stop control, and the fuel efficiency of the vehicle 100 can be further improved as described above.

Next, FIG. 6 is a diagram illustrating yet another example of a method of changing the threshold in the flowchart of FIG. 3. Specifically, it is a diagram illustrating a relationship between the SOF of the battery 20 and the threshold Eth.

Note that, in the present embodiment, the SOF (state of function) of the battery 20 is represented by a ratio (percentage) of a current discharging performance to a reference discharging performance of the battery 20. Namely, in the following description, "the SOF of the battery 20 is good" or "the SOF of the battery 20 is high" means that the discharging performance of the battery 20 is in a comparatively high state, "the SOF of the battery 20 is bad" or "the SOF of the battery 20 is low" means that the current discharging performance of the battery 20 is in a comparatively low state. Also, the discharging performance of the battery 20 may be determined, for example, the magnitude of a voltage drop, or a response voltage when discharging the battery 20 by a predetermined current pattern. Also, a relationship among A31, A32, A33, A34, and A35, which represent specific numerical values in the figure, is A31<A32<A33<A34<A35.

Referring to FIG. 6, the start-stop ECU 80 sets the threshold Eth to A31 if the SOF of the battery 20 detected (calculated) by the battery sensor 21 is greater than or equal to 90% and less than or equal to 100%. Also, the start-stop ECU 80 sets the threshold Eth to A32 if the SOF of the battery 20 detected (calculated) by the battery sensor 21 is greater than or equal to 85% and less than 90%. Also, the start-stop ECU 80 sets the threshold Eth to A33 if the SOF of the battery 20 detected (calculated) by the battery sensor 21 is greater than or equal to 80% and less than 85%. Also, the start-stop ECU 80 sets the threshold Eth to A34 if the SOF of the battery 20 detected (calculated) by the battery sensor 21 is greater than or equal to 75% and less than 80%. Also, the start-stop ECU 80 sets the threshold Eth to A35 if the SOF of the battery 20 detected (calculated) by the battery sensor 21 is less than 75%.

In this way, the vehicle control apparatus 1 according to the present embodiment changes the threshold Eth which is used for determining whether to permit or inhibit the stop idling of the vehicle 100 depending on the SOF as a state relating to discharging performance of the battery 20. Specifically, the threshold Eth is set to a smaller value for a better (higher) SOF of the battery 20, or a greater value for a worse (lower) SOF of the battery 20.

The discharging performance of the battery 20 and the SOF has a correlation where the higher the SOF of the battery 20 is, the higher the discharging performance of the battery 20 is, and the higher the cranking voltage of the battery 20 is when starting the engine 10. Therefore, by setting the threshold Eth smaller when the SOF of the battery 20 is higher, it is possible to further increase opportunities of automatic stopping of the engine 10 by the start-stop control, and the fuel efficiency of the vehicle 100 can be further improved as described above.

Note that although in the examples according to the present embodiment (FIG. 4 to FIG. 6), the threshold Eth is changed in five stages with respect to the SOC, SOH, and SOF of the battery 20, respectively, the threshold Eth may be changed in finer stages (for example, 10 stages), or in more coarse stages (for example, three stages). Also, although the threshold Eth is changed stepwise with respect to the SOC, SOH, and SOF of the battery 20, respectively, in the examples, the threshold Eth may be changed continuously at least partially.

Also, the start-stop ECU 80 may execute a setting process of the threshold Eth based on the state (SOC, SOH, or SOF) relating to the discharging performance of the battery 20 detected by the battery sensor 21, in parallel with Step S101 in the flowchart of FIG. 3. Also, the start-stop ECU 80 may execute a setting process of the threshold Eth based on the state (SOC, SOH, or SOF) relating to the discharging performance of the battery 20 detected by the battery sensor 21, between Steps S101 and S102 in the flowchart of FIG. 3.

Third Embodiment

Next, a third embodiment will be described.

A vehicle control apparatus 1 according to the present embodiment also changes the threshold Eth in the flowchart of FIG. 3 described above, but depending on a lowest voltage (cranking voltage) of the battery 20 when starting the engine 10 for the previous (latest) time, which is different from the first and second embodiments. In the following, the same elements as in the first and second embodiments are assigned the same numerical codes, and different parts will be mainly described.

Note that a configuration of the vehicle control apparatus 1 according to the present embodiment can be represented by FIGS. 1-2 as in the first and second embodiments, and their description is omitted.

Next, FIG. 7 is a diagram illustrating yet another example of a method of changing the threshold Eth in the flowchart of FIG. 3. Specifically, it is a diagram illustrating a relationship between the lowest voltage Vmin of the battery 20 and the threshold Eth when starting the engine 10 for the previous time.

Note that a relationship among A41, A42, A43, A44, and A45, which represent specific numerical values in the figure, is A41<A42<A43<A44<A45.

Referring to FIG. 7, the start-stop ECU 80 sets the threshold Eth to A41 if the lowest voltage Vmin of the battery 20 detected by the battery sensor 21 when starting the engine 10 for the previous time is greater than or equal to 10 V. Also, the start-stop ECU 80 sets the threshold Eth to A42 if the lowest voltage Vmin of the battery 20 detected by the battery sensor 21 when starting the engine 10 for the previous time is greater than or equal to 9 V and less than 10 V. Also, the start-stop ECU 80 sets the threshold Eth to A43 if the lowest voltage Vmin of the battery 20 detected by the battery sensor 21 when starting the engine 10 for the previous time is greater than or equal to 8 V and less than 9 V. Also, the start-stop ECU 80 sets the threshold Eth to A44 if the lowest voltage Vmin of the battery 20 detected by the battery sensor 21 when starting the engine 10 for the previous time is greater than or equal to 7 V and less than 8 V. Also, the start-stop ECU 80 sets the threshold Eth to A45 if the lowest voltage Vmin of the battery 20 detected by the battery sensor 21 when starting the engine 10 for the previous time is less than 7 V.

Note that the start-stop ECU 80 may execute buffering for the voltage of the battery 20 detected by the battery sensor 21 for a predetermined time, depending on a timing to transmit an engine start request to the engine ECU 70 or a timing to receive an IG-ON signal, to obtain the lowest voltage Vmin of the battery 20 when starting the engine 10. Also, the start-stop ECU 80 may store the obtained lowest voltage Vmin of the battery 20 when starting the engine 10 in an internal memory or the like, to read out it from the internal memory appropriately, and to execute the setting process of the threshold Eth described above.

In this way, the vehicle control apparatus 1 according to the present embodiment changes the threshold Eth to determine whether to permit or inhibit the stop idling of the vehicle 100 depending on the lowest voltage of the battery 20 when starting the engine 10 for the previous time. Specifically, the threshold Eth is set to a smaller value if the lowest voltage of the battery 20 when starting the engine 10 for the previous time is higher, or to a greater value if the lowest voltage of the battery 20 when starting the engine 10 for the previous time is lower.

As described above, the higher the discharging performance of the battery 20 is, the higher the lowest voltage of the battery 20 is when starting the engine 10, and the headlight 30 flickers to a lesser extent when starting the engine 10. Therefore, in the present embodiment, the discharging capability of the battery 20 when starting the engine 10 for the previous time, namely, the lowest voltage of the battery 20 when starting the engine 10 for the previous time is used as an index to represent the discharging capability of the battery 20, and the threshold Eth is set depending on the index. Namely, the threshold Eth is set smaller when the lowest voltage of the battery 20 when starting the engine 10 for the previous time is higher. This makes it possible to further increase opportunities of automatic stopping of the engine 10 by the start-stop control, and the fuel efficiency of the vehicle 100 can be further improved as described above with the second embodiment.

Note that although in the present embodiment, the threshold Eth is changed in five stages with respect to the lowest voltage of the battery 20 when starting the engine 10 for the previous time, the threshold Eth may be changed in finer stages (for example, 10 stages), or in more coarse stages (for example, three stages). Also, although the threshold Eth is changed stepwise with respect to the lowest voltage of the battery 20 when starting the engine 10 for the previous time, the threshold Eth may be changed continuously at least partially.

Also, the start-stop ECU 80 may execute a setting process of the threshold Eth based on the lowest voltage of the battery 20 when starting the engine 10 for the previous time detected by the battery sensor 21, in parallel with Step S101 in the flowchart of FIG. 3. Also, the start-stop ECU 80 may execute a setting process of the threshold Eth based on the lowest voltage of the battery 20 when starting the engine 10 for the previous time detected by the battery sensor 21, between Steps S101 and S102 in the flowchart of FIG. 3.

The embodiments of the present invention have been described in detail. Note that the present invention is not limited to the above specific embodiments, but various changes, substitutions, and alterations could be made without departing from the spirit and scope of the present invention.

For example, in the embodiments described above, although the vehicle control apparatus 1 uses the illuminance at a predetermined part on the outside or in the vehicle compartment of the vehicle 100 as a physical quantity (the illuminance E) corresponding to the brightness around the vehicle 100 to execute the control, another physical quantity may be used. For example, the start-stop ECU 80 may use brightness information of a predetermined region in an image (the average of the brightness of pixels) around the vehicle 100 captured by a camera built in the vehicle 100 (for example, an upper part region including a part of the sky in front of the vehicle 100), to control to permit or inhibit the stop idling.

Also, the threshold Eth described above may be set (changed) by a method that appropriately combines the methods of setting (changing) the threshold Eth described with the second and third embodiments. For example, the threshold Eth may be set to a greatest value of the thresholds Eth that are set by the example methods described in the second and third embodiments. This make it possible to evaluate the discharging performance of the battery 20 based on multiple indices (the SOC, SOH, and SOF of the battery 20, and the lowest voltage of the battery 20 when starting the engine 10 for the previous time), and to improve reliability of the threshold Eth to be set.

Also, in the embodiments described above, although the condition to inhibit the stop idling (the headlight 30 is on and the illuminance E is less than or equal to the threshold Eth) is provided separately from the engine stopping condition, the condition on the headlight 30 and the illuminance E may be included in the engine stopping condition. Namely, the engine stopping condition may include a condition that is satisfied if the headlight 30 is off, and/or the illuminance E by detected the illumination sensor 60 is greater than the threshold Eth.

Also, the vehicle control apparatus 1 according to the embodiments described above may be used for a vehicle that executes automatic stopping of the engine, based on a condition other than the start-stop control. For example, the vehicle control apparatus 1 according to the embodiments described above may be used for a vehicle that controls the engine to stop automatically if a predetermined stopping condition is satisfied while traveling (if the accelerator pedal is released while traveling at a predetermined speed or greater), to have the vehicle travel by inertia (coasting control). A vehicle under such coasting control may also have the headlight go out or flicker when the engine starts after having stopped automatically and a predetermined starting condition (such as the acceleration pedal is stepped on) is satisfied, which may have influence on the driver of the vehicle and other vehicles around the vehicle. Therefore, by using the vehicle control apparatus 1 according to the embodiments, substantially the same operations and effects can be obtained. Namely, it possible to have the engine stop automatically depending on circumstances even if the headlight is on, while avoiding unfavorable influences of a gone-out or flickering headlight, which could happen when restarting the engine 10 after having the engine 10 stopped automatically, and hence, the fuel efficiency of the vehicle 100 can be improved.

The present application is based on and claims the benefit of priority of Japanese Priority Application No. 2014-206707, filed on Oct. 7, 2014, the entire contents of which are hereby incorporated by reference.

The invention claimed is:

1. A vehicle control apparatus, comprising:
   an engine configured to drive a vehicle;
   a starter configured to start the engine;
   a headlamp configured to radiate light in front of the vehicle;
   a battery configured to supply driving electric power to the starter and the headlamp;
   a brightness detection unit configured to detect a physical quantity corresponding to brightness around the vehicle; and
   a control unit configured to have the engine stop automatically when a predetermined stopping condition is satisfied, and to have the engine start automatically when a predetermined starting condition is satisfied,
   wherein the control unit inhibits the engine from stopping automatically when the headlamp is lighted, and the physical quantity detected by the brightness detection unit is less than or equal to a predetermined threshold.

2. The vehicle control apparatus, as claimed in claim 1, further comprising:

a state detection unit configured to detect a state relating to discharging performance of the battery,
wherein the predetermined threshold is a lower predetermined threshold when the state is a higher state, the predetermined threshold is a higher predetermined threshold when the state is a lower state, the lower predetermined threshold is lower than the higher predetermined threshold, and the lower state is lower than the higher state.

3. The vehicle control apparatus, as claimed in claim 2, wherein the state detection unit detects, as the state, a state of charge of the battery,
wherein the predetermined threshold is the lower predetermined threshold when the state of charge of the battery is a higher state of charge of the battery, the predetermined threshold is the higher predetermined threshold when the state of charge of the battery is a lower state of charge of the battery, and the lower state of charge of the battery is lower than the higher state of charge of the battery.

4. The vehicle control apparatus, as claimed in claim 2, wherein the state detection unit detects, as the state, a state of health of the battery,
wherein the predetermined threshold is the lower predetermined threshold when the state of health of the battery is a higher state of health of the battery, the predetermined threshold is the higher predetermined threshold when the state of health of the battery is a lower state of health of the battery, and the lower state of health of the battery is lower than the higher state of health of the battery.

5. The vehicle control apparatus, as claimed in claim 2, wherein the state detection unit detects, as the state, a state of function of the battery,
wherein the predetermined threshold is the lower predetermined threshold when the state of function of the battery is a higher state of function of the battery, the predetermined threshold is the higher predetermined threshold when the state of function of the battery is a lower state of function of the battery, and the lower state of function of the battery is lower than the higher state of function of the battery.

6. The vehicle control apparatus, as claimed in claim 1, further comprising:
a voltage detection unit configured to detect a voltage of the battery,
wherein the predetermined threshold is the lower predetermined threshold when the voltage of the battery detected by the voltage detection unit when starting the engine most recently is a higher voltage, the predetermined threshold is the higher predetermined threshold when the voltage of the battery detected by the voltage detection unit when starting the engine most recently is a lower voltage, and the lower voltage is lower than the higher voltage.

7. A vehicle control apparatus, comprising:
an engine configured to drive a vehicle;
a starter configured to start the engine;
a headlamp configured to radiate light in front of the vehicle;
a battery configured to supply driving electric power to the starter and the headlamp; and
a control unit configured to have the engine stop automatically when a predetermined stopping condition is satisfied, and to have the engine start automatically when a predetermined starting condition is satisfied,
wherein the vehicle includes an automatic lighting function to have the headlamp light automatically when brightness around the vehicle is reduced to a predetermined value or lower,
wherein the control unit inhibits the engine from stopping automatically if the headlamp is lighted in a circumstance where the automatic lighting function has the headlamp light automatically, or permits the engine to stop automatically if the headlamp is lighted in a circumstance where the automatic lighting function does not have the headlamp light automatically.

\* \* \* \* \*